(12) United States Patent
Hsu

(10) Patent No.: US 11,914,273 B2
(45) Date of Patent: Feb. 27, 2024

(54) OPTICAL ENGINE MODULE AND PROJECTION DEVICE

(71) Applicant: Coretronic Corporation, Hsin-Chu (TW)

(72) Inventor: Ku-Hui Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/730,233

(22) Filed: Apr. 27, 2022

(65) Prior Publication Data

US 2022/0350229 A1 Nov. 3, 2022

(30) Foreign Application Priority Data

Apr. 30, 2021 (CN) .......................... 202120922135.9

(51) Int. Cl.
*G03B 21/00* (2006.01)
*G02B 27/28* (2006.01)
*G03B 21/20* (2006.01)
*G03B 21/28* (2006.01)

(52) U.S. Cl.
CPC ......... *G03B 21/005* (2013.01); *G02B 27/283* (2013.01); *G03B 21/204* (2013.01); *G03B 21/2073* (2013.01); *G03B 21/28* (2013.01)

(58) Field of Classification Search
CPC ............... G03B 21/005; G03B 21/204; G03B 21/2073; G03B 21/28; G02B 27/283

USPC .......................................................... 353/28
See application file for complete search history.

(56) References Cited

U.S. PATENT DOCUMENTS

| 7,204,592 B2 | 4/2007 | O'Donnell et al. |
| 2003/0058408 A1* | 3/2003 | Magarill .............. G02B 5/3083 353/20 |
| 2014/0176818 A1* | 6/2014 | Watson ................ G02B 27/283 359/489.09 |

FOREIGN PATENT DOCUMENTS

| TW | I424250 | 1/2014 |
| WO | 2020259615 | 12/2020 |

\* cited by examiner

*Primary Examiner* — Jerry L Brooks
(74) *Attorney, Agent, or Firm* — JCIPRNET

(57) ABSTRACT

An optical engine module configured to receive an illuminating beam is provided. The illuminating beam includes a first illuminating beam with a first linear polarization state. The optical engine module includes a first polarization beam splitting element, a first phase retardation element, and a first light valve. The first polarization beam splitting element is disposed on the transmission path of the illuminating beam and is configured to reflect the first illuminating beam to the first phase retardation element. The first phase retardation element is disposed on the transmission path of the first illuminating beam, and the first illuminating beam passes through the first phase retardation element and is transmitted to the first light valve. The first light valve is disposed on the transmission path of the first illuminating beam and is configured to convert the first illuminating beam into a first image beam.

18 Claims, 3 Drawing Sheets

OPTICAL ENGINE MODULE AND PROJECTION DEVICE

CROSS-REFERENCE TO RELATED APPLICATION

This application claims the priority benefit of China application serial no. 202120922135.9, filed on Apr. 30, 2021. The entirety of the above-mentioned patent application is hereby incorporated by reference herein and made a part of this specification.

BACKGROUND

Technical Field

The disclosure relates to an optical module and an electronic device, and in particular, to an optical engine module and a projection device.

Description of Related Art

In a conventional projection system of a projector, an image display array element in a digital light processing (DLP) system is a reflective element, so it has to be used with a specific incident angle. Accordingly, an optical prism is adopted to make a light source illuminate the image display array element at a specific angle through the deflection and the total reflection properties thereof and the light is reflected from the front of the image display array element. Conventional projection systems adopt multiple optical prisms, so when light is reflected from the front through the image display array element to a projection lens, another optical prism is required to correct the deflection of angle caused when the light travels through the previous optical prism. However, the design above is subject to a high cost and a problem of the system optical quality being compromised due to heat accumulation of the optical prism.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure is directed to an optical engine module and a projection device which reduce the space occupied by the optical engine module and its manufacturing cost and prevent the image quality from being compromised due to heat accumulation.

Other objectives and advantages of the invention will be further understood from the further technological features disclosed by the embodiments of the disclosure.

In order to achieve one or a portion of or all of the objects or other objects, the disclosure provides an optical engine module configured to receive an illuminating beam. The illuminating beam includes a first illuminating beam with a first linear polarization state. The optical engine module includes a first polarization beam splitting element, a first phase retardation element, and a first light valve. The first polarization beam splitting element is disposed on a transmission path of the illuminating beam and is configured to reflect the first illuminating beam to the first phase retardation element. The first phase retardation element is disposed on a transmission path of the first illuminating beam, and the first illuminating beam passes through the first phase retardation element and is transmitted to the first light valve. The first light valve is disposed on the transmission path of the first illuminating beam and is configured to convert the first illuminating beam into a first image beam. The first image beam from the first light valve passes through the first phase retardation element and is converted into the first image beam with a second linear polarization state. Next, the first image beam with the second linear polarization state passes through the first polarization beam splitting element.

In order to achieve one or a portion of or all of the objects or other objects, the disclosure further provides a projection device which includes an illumination system, an optical engine module, and a projection lens. The illumination system is configured to provide an illuminating beam. The illuminating beam includes a first illuminating beam with a first linear polarization state. The optical engine module includes a first polarization beam splitting element, a first phase retardation element, and a first light valve. The first polarization beam splitting element is disposed on a transmission path of the illuminating beam and is configured to reflect the first illuminating beam to the first phase retardation element. The first phase retardation element is disposed on a transmission path of the first illuminating beam, and the first illuminating beam passes through the first phase retardation element and is transmitted to the first light valve. The first light valve is disposed on the transmission path of the first illuminating beam and is configured to convert the first illuminating beam into a first image beam. The first image beam from the first light valve passes through the first phase retardation element and is converted into the first image beam with a second linear polarization state. Next, the first image beam with the second linear polarization state passes through the first polarization beam splitting element. The projection lens is disposed on a transmission path of the first image beam with the second linear polarization state and is configured to project the first image beam out of the projection device.

In light of the above, the embodiment of the disclosure has at least one of the following advantages or features. In the optical engine module and the projection device of the disclosure, the optical engine module can guide the illuminating beam to the light valve to convert it into the image beam and then transmit the image beam to the projection lens through the combination of the polarization beam splitting element, the phase retardation element, and the light valve. An additional optical prism is not required to be disposed. Accordingly, the space occupied by the optical engine module and the manufacturing cost may be reduced, and the image quality of the optical engine module may also be prevented from being compromised due to heat accumulation of the optical prism.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
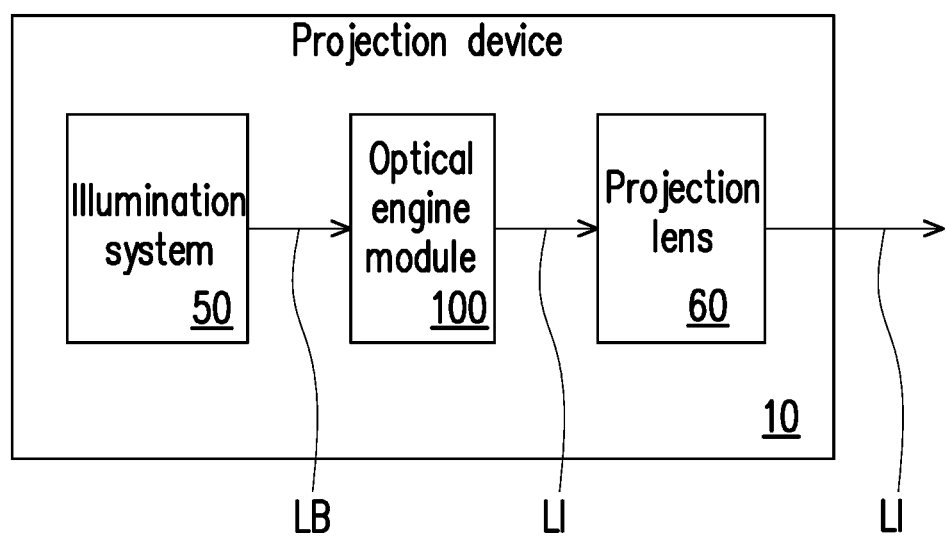
FIG. 1 is a schematic diagram of a projection device according to an embodiment of the disclosure.

FIG. 1 is a schematic diagram of a projection device according to an embodiment of the disclosure. Referring to FIG. 1, the embodiment provides a projection device 10 including an illumination system 50, an optical engine module 100, and a projection lens 60. The illumination system 50 is configured to provide an illuminating beam LB. The optical engine module 100 is disposed on a transmission path of the illuminating beam LB and is configured to convert the illuminating beam LB into an image beam LI. The projection lens 60 is disposed on the transmission path of the image beam LI and is configured to project the image beam LI out of the projection device 10 to a projecting target (not shown). The projecting target is, for example, a screen or a wall surface.

Figure 2:
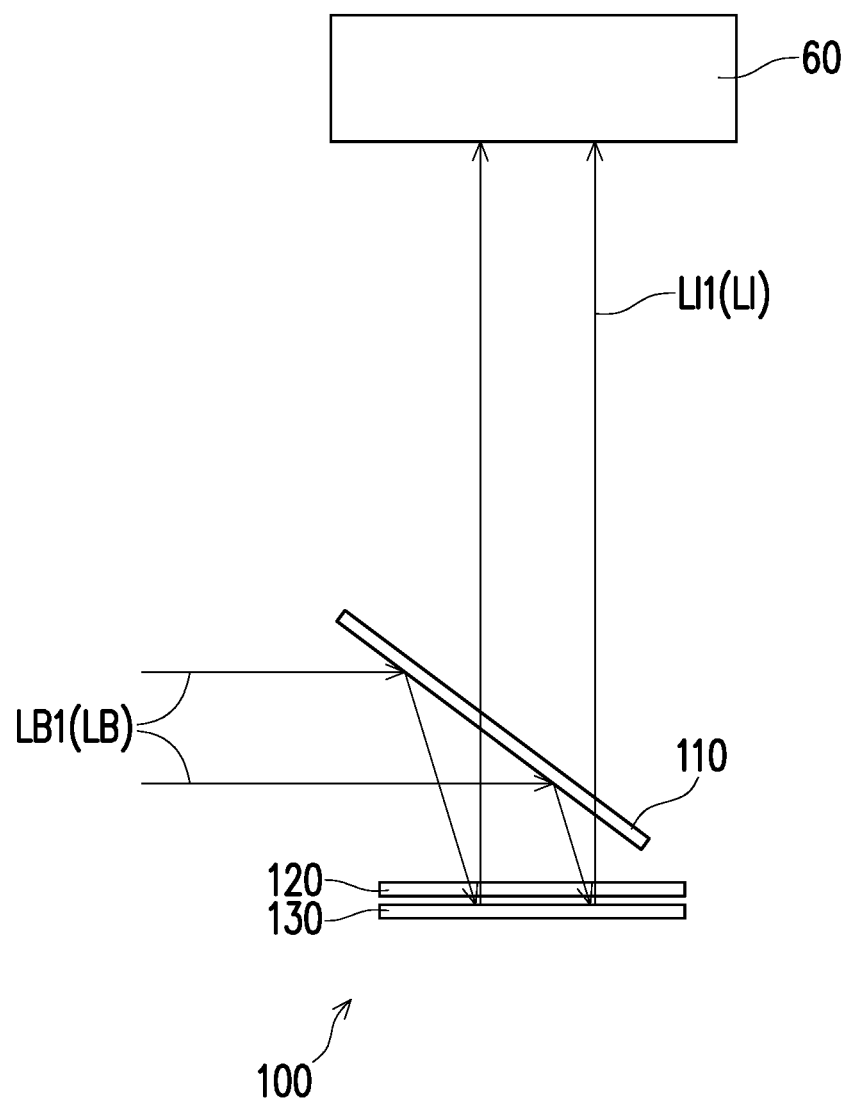
FIG. 2 is a schematic diagram of an optical engine module according to an embodiment of the disclosure.

FIG. 2 is a schematic diagram of an optical engine module according to an embodiment of the disclosure. Referring to FIG. 1 and FIG. 2, the illumination system 50 is composed of, for example, multiple light-emitting elements, a wavelength conversion element, a light homogenization element, a light-filtering element, and/or multiple light splitting and combining elements, and is configured to provide beams with different wavelengths as a light source of the image beam. However, the disclosure is not intended to limit the types and forms of the illumination system 50 in the projection device 10. With regard to the detailed structure and embodiments, sufficient teachings, suggestions, and descriptions of the embodiments may be acquired from the knowledge in this art, and they will not be repeated. In the embodiment, the illuminating beam LB provided by the illumination system 50 includes a first illuminating beam LB1 with a first linear polarization state (e.g. S-polarization). In addition, in the embodiment, the light source of the illumination system 50 only includes, for example, a laser light source configured to provide the first illuminating beam LB1 with the first linear polarization state; however, the disclosure is not limited thereto. Furthermore, the disclosure is not intended to limit the number of the laser light source.

The projection lens 60 includes, for example, a combination of one or multiple optical lens with a refractive power, such as various combinations of non-plane lenses including a biconcave lens, a biconvex lens, a concave-convex lens, a convex-concave lens, a plano-convex lens, a plano-concave lens, etc. In an embodiment, the projection lens 60 may further include a planar optical lens to project the image beam LI from the optical engine module 100 to a projecting target in a way of reflection. The disclosure is not intended to limit the types and forms of the projection lens 60.

Referring to FIG. 2, the optical engine module 100 includes a first polarization beam splitting element 110, a first phase retardation element 120, and a first light valve 130. In the embodiment, the first polarization beam splitting element 110 is, for example, a polarization beam splitter reflecting S-polarized light and allowing P-polarized light to pass through. The first phase retardation element 120 is, for example, a quarter wave plate and is configured to convert a linear polarized beam into a circular polarized beam or convert a circular polarized beam into a linear polarized beam. The first light valve 130 is a reflective light valve. The first light valve 130 is a reflective light modulator, such as a liquid crystal on silicon panel (LCoS panel) or a digital micro-mirror device (DMD). The disclosure is not intended to limit the types and forms of the light valve 130. In the embodiment, one light valve 130 is provided, but in other embodiments, multiple light valves may be provided. The disclosure is not limited thereto.

Specifically, in the embodiment, the first polarization beam splitting element 110 is disposed on the transmission path of the first illuminating beam LB1 and is configured to reflect the first illuminating beam LB1 to the first phase retardation element 120. The first phase retardation element 120 is disposed on the transmission path of the first illuminating beam LB1, and the first illuminating beam LB1 passes through the first phase retardation element 120 and is transmitted to the first light valve 130. The first light valve 130 is disposed on the transmission path of the first illuminating beam LB1 and is configured to convert the first illuminating beam LB1 into a first image beam LI1. The first image beam LI1 from the first light valve 130 passes through the first phase retardation element 120 and is converted into the first image beam LI1 with a second linear polarization state (e.g. P-polarization). Next, the first image beam LI1 with the second linear polarization state passes through the first polarization beam splitting element 110 to be transmitted to the projection lens 60. Therefore, an additional optical prism is not required to be disposed in the optical engine module 100. Accordingly, the space occupied by the optical engine module 100 and the manufacturing cost may be reduced, and also the optical quality of the optical engine module 100 may be prevented from being compromised due to heat accumulation of the optical prism.

Figure 3:
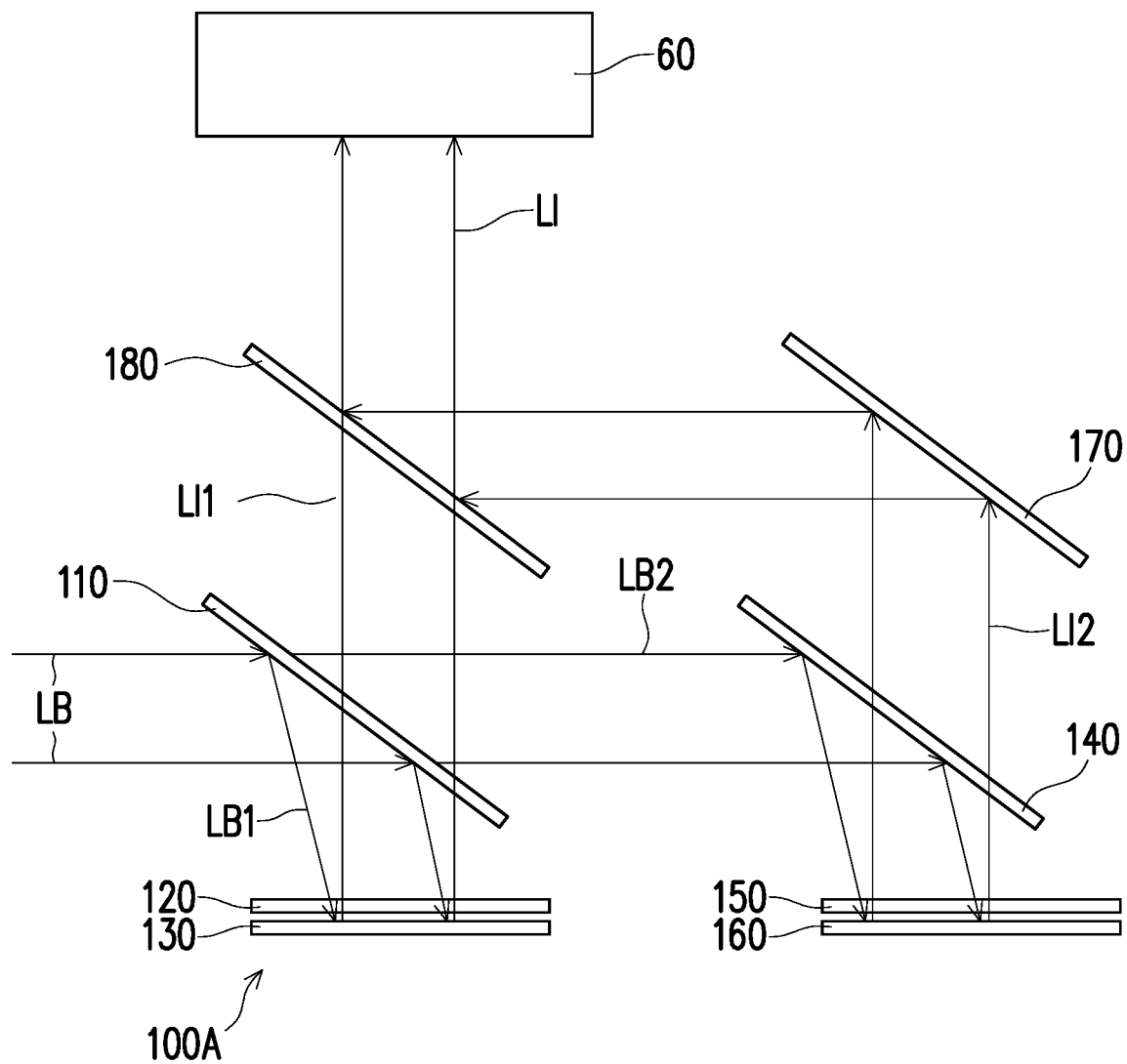
FIG. 3 is a schematic diagram of an optical engine module according to another embodiment of the disclosure.

FIG. 3 is a schematic diagram of an optical engine module according to another embodiment of the disclosure. Referring to FIG. 1 and FIG. 3, an optical engine module 100A shown in FIG. 3 is at least adapted for the projection device 10 shown in FIG. 1, so the optical engine module 100A adapted for the projection device 10 shown in FIG. 1 is taken as an example below. However, the disclosure is not limited thereto. The optical engine module 100A shown in FIG. 3 is similar to the optical engine module 100 shown in FIG. 2. In the embodiment, the difference between them is that the optical engine module 100A further includes a second polarization beam splitting element 140, a second phase retardation element 150, and a second light valve 160. In the embodiment, the second polarization beam splitting element 140 is, for example, a polarization beam splitter reflecting P-polarized light and allowing S-polarized light to pass through. The second phase retardation element 150 is similar to the first phase retardation element 120, for example, also a quarter wave plate. The second light valve 160 is similar to the first light valve 130, for example, also a reflective light valve. In the embodiment, the illumination system 50 transmits the illuminating beam LB including both of P-polarized light and S-polarized light to the optical engine module 100A. Accordingly, the laser light source as in the previous embodiment may be selected as a light source of the illumination system 50. In a different embodiment, a laser combined with a wavelength conversion device may be selected as the light source of the illumination system 50. The wavelength conversion device is, for example, a phosphor wheel. The disclosure is not limited thereto.

Specifically, in the embodiment, the illuminating beam LB includes the first illuminating beam LB1 with the first linear polarization state (e.g. S-polarization) and a second illuminating beam LB2 with the second linear polarization state (e.g. P-polarization). The first polarization beam splitting element 110 is configured to allow the second illuminating beam LB2 to pass through and to be transmitted to the second polarization beam splitting element 140. The second polarization beam splitting element 140 is disposed on the transmission path of the second illuminating beam LB2 and is configured to reflect the second illuminating beam LB2 to the second phase retardation element 150. The second phase retardation element 150 is disposed on the transmission path of the second illuminating beam LB2. The second illuminating beam LB2 passes through the second phase retardation element 150 and is transmitted to the second light valve 160. The second light valve 160 is disposed on the transmission path of the second illuminating beam LB2 and is configured to convert the second illuminating beam LB2 into the second image beam LI2. The second image beam LI2 from the second light valve 160 passes through the second phase retardation element 150 and is converted into the second image beam LI2 with the first linear polarization state (e.g. S-polarization). Next, the second image beam LI2 with the first linear polarization state passes through the second polarization beam splitting element 140 and is transmitted to the projection lens 60.

Furthermore, in the embodiment, the optical engine module 100A further includes a reflective element 170 and a third polarization beam splitting element 180. The reflective element 170 is, for example, a reflective mirror, which is configured to guide a beam and change the direction in which the second image beam LI2 is transmitted. The third polarization beam splitting element 180 is, for example, a polarization beam splitter reflecting S-polarized light and allowing P-polarized light to pass through. The third polarization beam splitting element 180 is the same as the first polarization beam splitting element 110.

Specifically, in the embodiment, the reflective element 170 is disposed to reflect the second image beam LI2 from the second polarization beam splitting element 140 to the third polarization beam splitting element 180. The third polarization beam splitting element 180 is disposed on a transmission path of the first image beam LI1 and the second image beam LI2. In the embodiment, the first polarization beam splitting element 110 is located between the third polarization beam splitting element 180 and the first phase retardation element 120. The third polarization beam splitting element 180 is configured to allow the first image beam LI1 with the second linear polarization state (e.g. P-polarization) to pass through and reflect the second image beam LI2 with the first linear polarization state (e.g. S-polarization). Next, the first image beam LI1 and the second image beam LI2 are synthesized and then transmitted to the projection lens 60. Therefore, an additional optical prism is not required to be disposed in the optical engine module 100A. Accordingly, the space occupied by the optical engine module 100A and the manufacturing cost may be reduced, and also the optical quality of the optical engine module 100A may be prevented from being compromised due to heat accumulation of the optical prism. In addition, compared with an optical engine system with a single light valve, in the embodiment, energy of a light source may be evenly distributed to the first light valve 130 and the second light valve 160, which further improves an image brightness and an image quality.

In summary, in the optical engine module and the projection device of the disclosure, the optical engine module can guide the illuminating beam to the light valve to convert it into the image beam and subsequently transmit the image beam to the projection lens through the combination of the polarization beam splitting element, the phase retardation element, and the light valve. An additional optical prism is not required to be disposed. Accordingly, the space occupied by the optical engine module and the manufacturing cost may be reduced, and also the optical quality of the optical engine module may be prevented from being compromised due to heat accumulation of the optical prism.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical engine module configured to receive an illuminating beam, wherein the illuminating beam comprises a first illuminating beam with a first linear polarization state and a second illuminating beam with a second linear polarization state, and the optical engine module comprises a first polarization beam splitting element, a first phase retardation element, a first light valve, a second polarization beam splitting element, a second phase retardation element and a second light valve, wherein
    the first polarization beam splitting element is disposed on a transmission path of the illuminating beam and is configured to reflect the first illuminating beam to the first phase retardation element;
    the first polarization beam splitting element is configured to allow the second illuminating beam to pass through and to be transmitted to the second polarization beam splitting element;
    the first phase retardation element is disposed on a transmission path of the first illuminating beam, and the first illuminating beam passes through the first phase retardation element and is transmitted to the first light valve;
    the second polarization beam splitting element is disposed on a transmission path of the second illuminating beam and is configured to reflect the second illuminating beam to the second phase retardation element;
    the second phase retardation element is disposed on the transmission path of the second illuminating beam, and the second illuminating beam passes through the second phase retardation element and is transmitted to the second light valve;
    the first light valve is disposed on the transmission path of the first illuminating beam and is configured to convert the first illuminating beam into a first image beam, wherein the first image beam from the first light valve passes through the first phase retardation element and is converted into the first image beam with the second linear polarization state, and then the first image beam with the second linear polarization state passes through the first polarization beam splitting element; and
    the second light valve is disposed on the transmission path of the second illuminating beam and is configured to convert the second illuminating beam into a second image beam, wherein the second image beam from the second light valve passes through the second phase retardation element and is converted into the second image beam with the first linear polarization state, and then the second image beam with the first linear polarization state passes through the second polarization beam splitting element.

2. The optical engine module according to claim 1, wherein the first phase retardation element is a quarter wave plate.

3. The optical engine module according to claim 1, wherein the optical engine module does not have an optical prism.

4. The optical engine module according to claim 1, wherein the second phase retardation element is a quarter wave plate.

5. The optical engine module according to claim 1, further comprising a reflective element and a third polarization beam splitting element, wherein:
    the reflective element is disposed to reflect the second image beam from the second polarization beam splitting element to the third polarization beam splitting element; and
    the third polarization beam splitting element is disposed on a transmission path of the first image beam and the second image beam and is configured to allow the first image beam with the second linear polarization state to pass through and reflect the second image beam with the first linear polarization state.

6. The optical engine module according to claim 1, wherein the first light valve is a reflective light valve.

7. The optical engine module according to claim 1, wherein the first light valve and the second light valve are reflective light valves.

8. The optical engine module according to claim 5, wherein the first polarization beam splitting element is located between the third polarization beam splitting element and the first phase retardation element.

9. A projection device, comprising an illumination system, an optical engine module, and a projection lens, wherein:
    the illumination system is configured to provide an illuminating beam, wherein the illuminating beam comprises a first illuminating beam with a first linear polarization state and a second illuminating beam with a second linear polarization state;
    the optical engine module comprises a first polarization beam splitting element, a first phase retardation element, a first light valve, a second polarization beam splitting element, a second phase retardation element and a second light valve, wherein:
        the first polarization beam splitting element is disposed on a transmission path of the first illuminating beam and is configured to reflect the first illuminating beam to the first phase retardation element;
        the first polarization beam splitting element is configured to allow the second illuminating beam to pass through and to be transmitted to the second polarization beam splitting element;
        the second polarization beam splitting element is disposed on a transmission path of the second illuminating beam and is configured to reflect the second illuminating beam;
        the first phase retardation element is disposed on the transmission path of the first illuminating beam, and the first illuminating beam passes through the first phase retardation element and is transmitted to the first light valve;

the second phase retardation element is disposed on the transmission path of the second illuminating beam, and the second illuminating beam passes through the second phase retardation element and is transmitted to the second light valve;

the first light valve is disposed on the transmission path of the first illuminating beam and is configured to convert the first illuminating beam into a first image beam, wherein the first image beam from the first light valve passes through the first phase retardation element and is converted into the first image beam with the second linear polarization state, and then the first image beam with the second linear polarization state passes through the first polarization beam splitting element; and the second light valve is disposed on the transmission path of the second illuminating beam and is configured to convert the second illuminating beam into a second image beam, wherein the second image beam from the second light valve passes through the second phase retardation element and is converted into the second image beam with the first linear polarization state, and then the second image beam with the first linear polarization state passes through the second polarization beam splitting element; and the projection lens is disposed on a transmission path of the first image beam with the second linear polarization state and is configured to project the first image beam out of the projection device.

10. The projection device according to claim 9, wherein the first phase retardation element is a quarter wave plate.

11. The projection device according to claim 9, wherein the optical engine module does not have an optical prism.

12. The projection device according to claim 9, wherein the second phase retardation element is a quarter wave plate.

13. The projection device according to claim 9, wherein the optical engine module further comprises a reflective element and a third polarization beam splitting element, wherein:

the reflective element is disposed to reflect the second image beam from the second polarization beam splitting element to the third polarization beam splitting element; and the third polarization beam splitting element is disposed on a transmission path of the first image beam and the second image beam and is configured to allow the first image beam with the second linear polarization state to pass through and reflect the second image beam with the first linear polarization state.

14. The projection device according to claim 9, wherein the first light valve is a reflective light valve.

15. The projection device according to claim 9, wherein the first light valve and the second light valve are reflective light valves.

16. The projection device according to claim 13, wherein the first polarization beam splitting element is located between the third polarization beam splitting element and the first phase retardation element.

17. The projection device according to claim 9, wherein the illumination system comprises a laser light source configured to provide the first illuminating beam with the first linear polarization state.

18. The projection device according to claim 9, wherein the illumination system comprises a laser light source configured to provide the first illuminating beam with the first linear polarization state, or the illumination system comprises a laser and a wavelength conversion device configured to provide the first illuminating beam with the first linear polarization state and the second illuminating beam with the second linear polarization state.

* * * * *